: 3,050,408
Patented Aug. 21, 1962

3,050,408
COMPOSITE LEAD-OXIDE-SILICA PARTICLES
Joseph A. Orsino, Mountain Lakes, N.J., and Edward J. Dunn, Jr., Port Washington, N.Y., assignors to National Lead Company, New York, N.Y., a corporation of New Jersey
No Drawing. Filed Apr. 28, 1959, Ser. No. 809,344
19 Claims. (Cl. 106—297)

This invention relates to composite lead oxide-silica particles. In particular, this invention relates to composite lead oxide-silica particles and process of manufacture therefor.

Red lead has been used in very large quantities for years in making metal protective coatings with good rust-inhibiting properties. This is attributed in part to the fact that red lead is basic in reaction. It has, however, been an expensive material to use; moreover, it is nearly all lead, which is a costly material from a painter's standpoint, and is made from metallic lead by several successive operations, each of which costs something, so that it makes a rather expensive paint. One reason for the high volume of red lead needed is that basic chemical compounds capable of reacting with the acidic decomposition products of the film are required for good film durability, or an excess of the basic lead oxide used as the pigment is likewise required. These decomposition products are formed in the film binder on exposure to the weather and are associated with polymer degradation, leading to softening and liquidfication of the film. The basic pigments react with these products to form solid metallic soaps and stabilize the film, maintaining its integrity and increasing its durability. By this means, the life of an oil film can be extended much longer under normal weathering conditions. Litharge is incorporated into paints, but it is not incorporated for its pigment properties; rather it is incorporated into paints because of its chemical reactivity. Litharge is a basic chemical compound and is an oxidation accelerator. Litharge is thus incorporated into paints as a drying agent, and as described previously in connection with red lead, as a basic chemical compound to react with the decomposition products formed in the film binder on exposure to weather. It is however, only the surface of the pigment particle which enters into the reaction, and for the above reasons, an excess of the basic lead oxide was used.

Silica, $SiO_2$ is used as a pigment when finely divided; however, silica has a low reactivity with common paint vehicles, and contributes little to the quality of the paint. Silica is most often used as a diluent or extender pigment in low cost paints, but one undesirable effect of the silica is to lower the hiding power.

An object of this invention therefore, is to provide an extended lead oxide pigment. Another object is to provide a silica cored lead oxide pigment. Another object is to provide a pigment containing a substantial proportion of silica without the normal deleterious effect of such silica content on the pigment properties. Yet another object is to provide a long weathering pigment of low lead oxide content. Another object still, is to provide a more economical lead oxide particle of good quality. Still an additional object is to provide a process of manufacture of a silica cored lead oxide particle. Other objects and advantages will become apparent from the following more complete description and claims.

Broadly, this invention contemplates a composite lead oxide-silica particle. This invention also contemplates a process for the manufacture of a silica cored lead oxide particle comprising the steps of preparing a slurry of silica and at least one lead oxide, deliquoring said slurry, and calcining the solid portion thereof at elevated temperature.

In a particularly desirable embodiment, this invention contemplates a process as aforeside, wherein the silica and lead oxide or oxides, are ground together in an aqueous slurry in a ball mill. It is believed that the grinding activates the surface of the silica making it receptive to the fine particles of oxide or oxides. The length of time for the grinding will vary according to the particular conditions employed, but in the usual case should be from about 4 to 12 hours. Below 4 hours, the surface of the silica is not sufficiently activated and an incomplete coating is produced. There is ordinarily no advantage in employing a grinding time of more than 12 hours. It is preferred however to employ a grinding time of 5 hours, as this has been found to produce better results.

The temperature of calcination may vary from 450° C. to 600° C. Below 450° C. very little calcination takes place and the product is a simple mixture of lead oxide particles and silica particles. A temperature of calcination above 600° C., often produces a partially sintered product which is gritty in character.

At calcination temperatures of from 470° C. to 500° C. litharge is converted to red lead.

At calcination temperatures of from 500° C. to 600° C., red lead is converted to litharge.

At calcination temperatures of from 450° C. to 470° C., substantially no conversion of litharge to red lead or vice versa takes place.

From the above statements, it is readily apparent that any desired silica cored litharge or red lead, or litharge and red lead composition may be produced merely by varying the starting materials and the calcination temperature. For example, if we start with a mixture of 50% silica, 25% litharge, and 25% red lead and calcine that mixture at 450° C. to 470° C., a silica cored lead oxide particle will be produced which is substantially 50% silica, 25% litharge, and 25% red lead. If we now take this silica cored lead oxide and further calcine at temperatures of from 470° C. to 500° C., some of the litharge will be converted to red lead. The amount of conversion to red lead may be determined by removing samples and determining the composition of the sample. The amount of conversion of the litharge to red lead would also depend upon the length of time of calcination at the 470° C. to 500° C. temperature range; a longer time of calcination at that range obviously favoring the formation of red lead. In this manner, the composition would now contain a higher percentage of red lead than litharge.

If we now take this silica cored lead oxide which contains more red lead than litharge, and calcine this composition at temperatures of from 500° C. to 600° C., some or all of the red lead, depending upon the length of time of calcination at this temperature range, would be converted to litharge. The degree of conversion to litharge may be determined by removing samples and ascertaining the composition of the sample.

In the above described manner, it is readily apparent that silica cored lead oxides may be produced which contain mixtures of red lead and litharge. Such silica cored mixtures may also be produced by employing a mixture of red lead and litharge and calcining at temperatures of from 450° C. to 470° C. It should also be noted that after the calcination process at the 500° C. to 600° C. temperature range is completed, the silica cored lead oxide particle should be quick cooled, as for example, by spreading it out on a cool stainless steel table, or in any other means of quick cooling known to the art and consistent with the nature of the composition of this invention. As the silica cored lead oxide composition produced at calcination temperatures of from 500° C. to 600° C. cools, it will through necessity pass through the 470° C. to 500° C. temperature range. As previously noted, this is the range wherein litharge is converted to red lead. Therefore, unless it is desired to convert some of the litharge to red lead, the particles should be quick cooled to prevent this conversion.

Some red lead should be present in the physical mixture before calcination as lead silicate may be formed, in the absence of red lead, throughout the entire calcination temperature range of the process of this invention, that is 450° C. to 600° C. The red lead acts, in some manner unknown to applicants, as a deterrent to the formation of lead silicate. The amount of red lead needed in order to prevent the conversion of litharge to lead silicate will vary widely according to the particular conditions employed; but generally speaking, the amount of red lead present should be from 5% to 50% based on the total weight of red lead, litharge, and silica. Red lead should be present at temperatures of from 450° C. to 470° C. as some litharge is converted to lead silicate at that temperature. The time of calcination may vary from about 2 to 8 hours. Below 2 hours, one or both of two things may happen. Either an incomplete coating will be produced, or substantially all of the litharge will not be converted to red lead. A calcination time above 8 hours is not desirable because there is not advantage to be gained from employing a longer calcination time. Obviously, the time of calcination will vary with the particular conditions employed. Generally speaking, higher calcination temperatures favor shorter calcination time.

Generally speaking, the amount of water present may vary widely within the discretion of the operator. There should not be present however, such an amount of water that the grinding action previously mentioned is prevented. The amount of water which we have used is from 250 ml. to 500 ml. per 800 grams of silica plus lead oxide, but, as previously mentioned, this amount of water may be widely varied. The mixture is then deliquored and the solid portion thereof is then calcined as previously described.

A caustic may be present in the aqueous slurry. While the process is excellent without the acid of a caustic, the presence of a caustic helps to render the silica more receptive to being coated, although the mechanism whereby it does so is not fully understood. The caustic should not be present in amounts in excess of 0.5% based on the weight of silica, red lead, and litharge if present. Amounts in excess of 0.5% cause an undesirable agglomeration of the silica cored lead oxide particle.

The proportion of lead oxide to silica in the silica cored particle, may vary over a wide range of from 20% to 95% for an amount of silica of from 5% to 80%. These proportions are operable so that the entire range of one is operable with the entire range of the other, the sum totaling substantially 100%. It is preferred however, for paint purposes to have approximately equal proportions of the silica and the lead oxide as these amounts produce a more durable coating. The desired thickness of the coating may be varied according to the needs and wants of the consumer, by varying the weight of the silica, and lead oxide used.

In order to more fully illustrate the nature of this invention and the manner of practicing the same, the following examples are presented.

Example I

Silica, 1,400 grams, and 1,400 grams of a mixture containing 25% red lead and 75% litharge were ground together in an aqueous slurry containing 2,000 ml. of water, in a ball mill for 6 hours at room temperature. The slurry was deliquored and dried, and the solid portion thereof was then calcined at 480° C. to 490° C. for 6 hours. The product was a soft powder and gave the following analysis:

| | Percent |
|---|---|
| $SiO_2$ | 50 |
| PbO | 2 |
| $Pb_3O_4$ | 48 |

Substantially no free silica was found. By free silica, we mean silica which is not substantially coated with lead oxide.

Example II

The procedure of Example I was repeated and the silica and red lead plus litharge mixture were ground together in an aqueous slurry containing 2,000 ml. of water. After grinding for 6 hours at room temperature, the slurry was deliquored and dried, and the solid portion thereof was calcined at 460° C. to 480° C. for 3 hours. The product was a soft powder and the following analysis was obtained for the silica cored red lead-litharge product:

| | Percent |
|---|---|
| $SiO_2$ | 50 |
| PbO | 30 |
| $Pb_3O_4$ | 20 |

Substantially no free silica was found.

Example III

The procedure of Example I was repeated except that 2,000 ml. of water was used, and 0.3% of KOH was used and the entire mixture of $SiO_2$, PbO, $Pb_3O_4$, and KOH were ground together in a ball mill for 4 hours at room temperature. The slurry was deliquored and dried, and the mixture was calcined at 480° C. to 490° C. for 4 hours. The product was a soft powder and gave the following analysis:

| | Percent |
|---|---|
| $SiO_2$ | 51 |
| PbO | 3 |
| $Pb_3O_4$ | 46 |
| KOH | Trace |

Substantially no free silica was found.

Example IV

The procedure of Example I was repeated except that 140 grams of silica was used and 2,660 grams of a mixture containing 25% red lead and 75% litharge was used. The product was a soft powder and gave the following analysis:

| | Percent |
|---|---|
| $SiO_2$ | 5 |
| PbO | 45 |
| $Pb_3O_4$ | 50 |

Substantially no free silica was found.

Example V

The procedure of Example I was repeated except that 2,240 grams of silica was used and 560 grams of a mixture containing 25% red lead and 75% litharge was used. The product was a soft powder and gave the following analysis:

| | Percent |
|---|---|
| $SiO_2$ | 80 |
| PbO | 2 |
| $Pb_3O_4$ | 18 |

Substantially no free silica was found.

Example VI

The procedure of Example I was repeated except that 1,400 grams of a mixture containing 90% red lead and 10% litharge was used. The product was a soft powder and gave the following analysis:

| | Percent |
|---|---|
| $SiO_2$ | 50 |
| PbO | 2 |
| $Pb_3O_4$ | 48 |

Substantially no free silica was found.

Example VII

The procedure of Example I was repeated twice, the first time, 1,300 grams of litharge and 100 grams of red lead was used and the mixture was calcined at 450° C. to 460° C. The calcination time was 3 hours. The silica cored lead oxide was a soft powder and gave the following analysis:

| | Percent |
|---|---|
| $SiO_2$ | 50 |
| PbO | 46 |
| $Pb_3O_4$ | 4 |

Substantially no free silica was found.

The second time, 1,400 grams of a mixture containing 25% of red lead and 75% litharge was used. The mixture was calcined at the upper calcination temperature, needed to produce a silica cored litharge, that is, above 500° C. The calcination temperature was 550° C. to 570° C. The calcination time was 3 hours. The silica cored litharge was a soft powder and gave the following analysis:

| | Percent |
|---|---|
| $SiO_2$ | 50 |
| PbO | 43 |
| $Pb_3O_4$ | 7 |

Substantially no free silica was found.

*Example VIII*

Silica, 1,400 grams, and 1,400 grams of a mixture containing 25% red lead and 75% litharge were ground together in an aqueous slurry containing 2,000 ml. of water, in a ball mill for 6 hours at room temperature. The slurry was deliquored and dried, and the solid portion thereof was then calcined at 455° C. to 465° C. for 2 hours. The calcination temperature was then raised to 480° C. to 490° C. and kept then for an additional 2 hours. The silica cored-litharge-red lead particles were a soft powder and gave the following analysis:

| | Percent |
|---|---|
| $SiO_2$ | 50 |
| PbO | 32 |
| $Pb_3O_4$ | 18 |

Substantially no free silica was found.

*Example IX*

The procedure of Example VIII was repeated, except that the mixture was calcined at 530° C. for 4 hours. The silica cored-litharge-red lead particles were a soft powder and gave the following analysis:

| | Percent |
|---|---|
| $SiO_2$ | 50 |
| PbO | 42 |
| $Pb_3O_4$ | 8 |

Substantially no free silica was found.

Paints formulated using the compositions of this invention were compared with paints formulated using a red lead-litharge mixture wherein no silica was incorporated. It was found that a paint using the pigment of Example I compared favorably to a paint wherein there was incorporated a pigment composed substantially of all red lead and containing no silica therein. We have found that the compositions of this invention, when incorporated into paints, exhibited upon standing, less settling in alkyd and linseed vehicles than did a paint prepared with a pigment composed substantially of all red lead. In addition, it was found that paints utilizing the compositions of this invention showed a much less increase in viscosity upon standing than did paints utilizing ordinary red lead containing no silica therein. It was also determined that paints utilizing as a pigment, the compositions of this invention exhibited a greater hiding power than did paints using substantially all red lead and containing no silica therein.

The novel process of this invention results in novel silica cored lead oxide particles which, as has been shown, compare favorably to, or are better than the lead oxide containing no silica core. In addition the silica cored lead oxide particles are more economical to use and should result in even wider use for lead oxides in paints than heretofore anticipated. The durability of a paint film containing the silica cored lead oxide particle is as good as that of one containing the ordinary lead oxide particle. The method itself is a simple one and can readily be carried out by an operator without special skill or training.

In addition, the silica cored lead oxide according to this invention may be used in lead acid storage battery plates with a resultant lesser battery weight and consequent savings to the consumer.

While this invention has been described in terms of certain preferred embodiments and illustrated by means of specific examples, these are illustrative only, and the invention is not to be construed as limited except as set forth in the following claims.

We claim:

1. A composite lead oxide-silica cored particle, the proportion of said lead oxide present being from 20% to 95%, the proportion of said silica present being from 80% to 5%, by weight based on the sum total of said lead oxide and said silica.

2. A composite lead oxide-silica cored particle according to claim 1, wherein said lead oxide is red lead.

3. A composite lead oxide-silica cored particle according to claim 1, wherein said lead oxide is litharge.

4. A composite lead oxide-silica cored particle according to claim 1, wherein said lead oxide is a mixture of red lead and litharge.

5. A process for the manufacture of a silica cored lead oxide particle comprising the steps of preparing a slurry of silica and at least one lead oxide, said lead oxide being present in amount from 20% to 95%, including at least 5% red lead, and said silica being present in amount from 5% to 80%, all percentages being based on the combined total weight of silica and lead oxide, grinding said slurry for at least 4 hours deliquoring said slurry, and calcining the solid portion thereof for at least 2 and not more than 8 hours at elevated temperature, wherein said elevated temperature is from 450° C. to 600° C., the time and temperature of calcination being so related that the solid portion contains red lead throughout calcination.

6. A process for the manufacture of silica cored red lead particle according to claim 5, wherein said elevated temperature is from 470° C. to 500° C.

7. A process for the manufacture of a silica cored red lead particle according to claim 5, wherein said elevated temperature is from 450° C. to 470° C.

8. A process for the manufacture of a silica cored litharge particle according to claim 5, wherein said elevated temperature is from 500° C. to 600° C.

9. A process for the manufacture of a silica cored litharge particle according to claim 5, wherein said elevated temperature is from 450° C. to 470° C.

10. A process for the manufacture of a silica cored red lead-litharge particle according to claim 5, wherein said elevated temperature is from 450° C. to 600° C. and the period of calcination is at least 2 hours.

11. A process for the manufacture of a silica cored lead oxide particle comprising the steps of preparing a slurry of silica with at least one lead oxide, and a caustic, said lead oxide being present in amount from 20% to 95%, including at least 5% red lead, said silica being present in amount from 5% to 80%, based on the combined total weight of the silica and lead oxide, said caustic being present in amount no greater than 0.5% based on the combined total weight of silica, lead oxide and caustic, grinding said slurry for at least 4 hours, deliquoring said slurry, and calcining the solid portion thereof for at least 2 and not more than 8 hours at elevated temperature, wherein said elevated temperature is from 450° C. to 600° C., the time and temperature of calcination being so related that the solid portion contains red lead throughout calcination.

12. A process for the manufacture of a silica cored red lead particle according to claim 11, wherein said elevated temperature is from 470° C. to 500° C.

13. A process for the manufacture of a silica cored litharge particle according to claim 11, wherein said elevated temperature is from 450° C. to 470° C.

14. A process for the manufacture of a silica cored litharge particle according to claim 11, wherein said elevated temperature is from 500° C. to 600° C.

15. A process for the manufacture of a silica cored red lead-litharge particle according to claim 11, wherein said elevated temperature is from 450° C. to 600° C. and the period of calcination is at least 2 hours.

16. A paint composition comprising as pigment therefor, a silica cored-lead oxide particle, wherein said silica is present from about 80% to about 5% and said lead oxide is present from about 20% to about 95% of the pigmentary particle.

17. A paint composition according to claim 16, wherein said lead oxide is litharge.

18. A paint composition according to claim 16, wherein said lead oxide is red lead.

19. A paint composition according to claim 16, wherein said lead oxide is a mixture of red lead and litharge.

References Cited in the file of this patent

UNITED STATES PATENTS

| | | |
|---|---|---|
| 2,197,605 | Barton | Apr. 16, 1940 |
| 2,236,051 | Barton | Mar. 25, 1941 |
| 2,563,367 | Read | Aug. 7, 1951 |
| 2,649,388 | Willis et al. | Aug. 18, 1953 |
| 2,677,621 | Clapson et al. | May 4, 1954 |
| 2,913,419 | Alexander | Nov. 17, 1959 |

FOREIGN PATENTS

| | | |
|---|---|---|
| 272,582 | Great Britain | June 10, 1927 |